(12) United States Patent
Anderson et al.

(10) Patent No.: US 8,994,560 B2
(45) Date of Patent: Mar. 31, 2015

(54) MANAGING PARKING SPACE AVAILABILITY (75) Inventors: Erik D. Anderson, Austin, TX (US); William A. Griffith, Austin, TX (US); Indran Naick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 13/344,764

(22) Filed: Jan. 6, 2012

(65) Prior Publication Data

US 2013/0176147 A1    Jul. 11, 2013

(51) Int. Cl.
B60Q 1/48 (2006.01)
G08G 1/14 (2006.01)

(52) U.S. Cl.
USPC ........ 340/932.2; 340/901; 709/224; 709/225; 701/423; 701/454; 701/533

(58) Field of Classification Search
USPC ............... 340/932.2, 995, 901; 709/224–225; 701/423, 454, 533
See application file for complete search history.

(56) References Cited

U.S. PATENT DOCUMENTS

| | | | |
|---|---|---|---|
| 6,650,250 B2 | 11/2003 | Muraki | |
| 6,885,312 B1 | 4/2005 | Kirkpatrick | |
| 7,049,979 B2 | 5/2006 | Dunning | |
| 7,516,010 B1* | 4/2009 | Kaplan et al. | 701/426 |
| 2004/0039632 A1* | 2/2004 | Han et al. | 705/13 |
| 2004/0252034 A1* | 12/2004 | Slemmer et al. | 340/932.2 |
| 2005/0195095 A1* | 9/2005 | Kato | 340/932.2 |
| 2005/0280555 A1 | 12/2005 | Warner, IV | |
| 2006/0250278 A1 | 11/2006 | Tillotson | |
| 2008/0048885 A1 | 2/2008 | Quinn | |
| 2009/0148259 A1* | 6/2009 | Shani | 414/231 |
| 2009/0179776 A1 | 7/2009 | Holden | |
| 2010/0042318 A1* | 2/2010 | Kaplan et al. | 701/204 |
| 2010/0060485 A1* | 3/2010 | Kim | 340/932.2 |
| 2010/0198498 A1* | 8/2010 | Jansen | 701/201 |
| 2010/0283632 A1* | 11/2010 | Kawabata et al. | 340/932.2 |
| 2010/0302067 A1* | 12/2010 | Goldman et al. | 340/932.2 |
| 2010/0328104 A1* | 12/2010 | Groft | 340/932.2 |
| 2011/0022427 A1 | 1/2011 | Dayan | |
| 2011/0077853 A1* | 3/2011 | Ranford et al. | 701/201 |
| 2011/0080304 A1* | 4/2011 | Toledo et al. | 340/932.2 |

(Continued)

OTHER PUBLICATIONS

Pullola, "Towards an Intelligent GPS-Based Vehicle Navigation System for Finding Street Parking Lots", 2007 IEEE International Conference on Signal Processing and Communications (CSPC 2007), Nov. 24-27, Dubai, United Arab Emirates, pp. 1251-1254.

(Continued)

*Primary Examiner* — Benjamin Lee
*Assistant Examiner* — Quang D Pham
(74) *Attorney, Agent, or Firm* — Paul S. Drake (57) ABSTRACT A method, system or computer usable program product for a data processing system to anticipate parking space availability including receiving from the first user a request for a parking space for a first vehicle, obtaining location tracking data of a set of users, each of the set of users associated with one of a set of vehicles, each vehicle located at one of a set of parking spaces, predicting a set of departure times based on the location tracking data for a subset of the set of users away from and associated with vehicles located in parking spaces, determining a subset of departure times that are within an acceptable period of time, and sending to the first user a subset of parking spaces with vehicles associated with users having the subset of departure times.

14 Claims, 6 Drawing Sheets (56) References Cited

U.S. PATENT DOCUMENTS

| | | | |
|---|---|---|---|
| 2011/0109480 A1 | 5/2011 | Huijnen | |
| 2011/0133959 A1* | 6/2011 | Suzuki et al. | 340/932.2 |
| 2011/0140922 A1* | 6/2011 | Levy et al. | 340/932.2 |
| 2011/0241898 A1* | 10/2011 | Busch | 340/932.2 |
| 2012/0056758 A1* | 3/2012 | Kuhlman et al. | 340/932.2 |
| 2012/0136997 A1* | 5/2012 | Yan et al. | 709/225 |
| 2012/0256766 A1* | 10/2012 | Lavoie | 340/932.2 |
| 2012/0265434 A1* | 10/2012 | Woodard et al. | 701/423 |
| 2012/0299749 A1* | 11/2012 | Xiao et al. | 340/932.2 |

OTHER PUBLICATIONS

The New York Times, Business Day Technology, "Now, to Find a Parking Spot, Drivers Look on Their Phones", published on the world wide web at http://www.nytimes.com/2011/05/08/technology/08parking.html?pagewanted=all.

"Intelligent Parking by GPS", instagps.com, Nov. 14, 2005, published on the world wide web at: http://web.archive.org/web/20081210172030/http://www.instagps.com/entry/intelligent-parking-by-gps/.

"Streetline: Finding a Parking Spot in San Francisco Will Become Easier", gpsobsessed.com, published on the world wide web at: http://gpsobsessed.com/streetline-finding-a-parking-spot-in-san-francisco-will-become-easier/.

"2009-062 Vehicular sensor network for gathering and disseminating real-time parking space availability information", flintbox.com, Jul. 30, 2010, published on the world wide web at: http://www.flintbox.com/public/project/4895/.

"Could In-Car GPS Show Available Parking Spots?", cargurus.com, Feb. 14, 2010, published on the world wide web at: http://blog.cargurus.com/2010/02/14/could-in-car-gps-show-available-parking-spots.

Mathur et al, "Parknet: Drive-by Sensing of Road-Side Parking Statistics", ACM MobiSys Jun. 15-18, 2010, published on the world wide web at: http://www.winlab.rutgers.edu/~suhas/SuhasMathur_Mobisys2010.pdf.

* cited by examiner

710 Name
720 Mobile Phone Number
730 ☐ Disabled Placard?
740 Credit Card Number
770 ☐ Add Another Vehicle?

Vehicle 1
750 License Plate
752 ☐ Compact Car?
754 ☐ Disabled Plate?

Vehicle 2
760 License Plate
762 ☐ Compact Car?
764 ☐ Disabled Plate?

MANAGING PARKING SPACE AVAILABILITY

BACKGROUND

1. Technical Field

The present invention relates generally to managing parking space availability, and in particular, to a computer implemented method for anticipating parking space availability utilizing tracking information.

2. Description of Related Art

Finding an empty parking space in a crowded parking lot has been an ongoing issue within our motorized society. A variety of parking lot search strategies have been observed. For example, some persons in vehicles will cruise slowly through row after row of cars looking for an empty parking space only to observe others doing the same until any last parking spaces are taken. Some persons in vehicles have been observed following persons walking out of a shopping center to their vehicle. Other persons may simply wait in their vehicle near the end of a row of parked cars until a parking space becomes available. These types of strategies are inefficient, waste resources and increase frustration in drivers.

SUMMARY

The illustrative embodiments provide a method, system, and computer usable program product for a data processing system to anticipate parking space availability including receiving from the first user a request for a parking space for a first vehicle, obtaining location tracking data of a set of users, each of the set of users associated with one of a set of vehicles, each vehicle located at one of a set of parking spaces, predicting a set of departure times based on the location tracking data for a subset of the set of users away from and associated with vehicles located in parking spaces, determining a subset of departure times that are within an acceptable period of time, and sending to the first user a subset of parking spaces with vehicles associated with users having the subset of departure times.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Steps may be taken to prevent the display or presentation of certain information rendered on a presenter's display. These steps may be taken as will be explained with reference to the various embodiments below.

Figure 1:
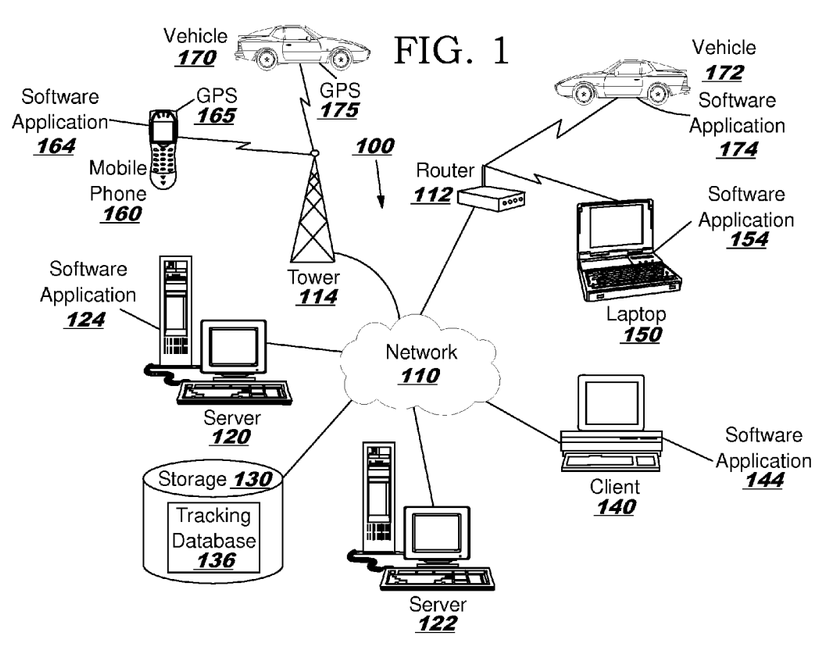
FIG. 1 depicts a block diagram of a network of data processing systems in which various embodiments may be implemented.

FIG. 1 depicts a pictorial representation of a network of data processing systems in which various embodiments may be implemented. Data processing environment 100 is a network of data processing systems also known as computers or computer devices in which the embodiments may be implemented. Software applications may execute on any computer or other type of data processing system in data processing environment 100. Data processing environment 100 includes network 110. Network 110 is the medium used to provide communications links between various devices and computers connected together within data processing environment 100. Network 110 may include connections such as wire, wireless communication links, or fiber optic cables.

Servers 120 and 122 and client 140 are coupled to network 110 along with storage unit 130. In addition, laptop 150 and vehicle 172 are coupled to network 110 including wirelessly through a network router 112. A mobile phone 160 and vehicle 170 are also coupled to network 110 through a mobile phone tower 114. Data processing systems, such as server 120, client 140, laptop 150, mobile phone 160, and vehicle 170 may contain data and may have software applications including software tools executing thereon. Other types of data processing systems such as personal digital assistants (PDAs), smartphones, tablets and netbooks may be coupled to network 110 through a variety of communications services.

Server 120 may include software application 124 such as for managing the tracking of individuals and vehicles in accordance with embodiments described herein. Storage 130 may contain a tracking database for maintaining data regarding the tracking of individuals and vehicles or other content for sharing among various computer or other data processing devices. Client 140 and laptop 150 may include software applications 144 and 154 for tracking purposes. Mobile phone 160 and vehicle 172 may also include software applications 164 and 174 for interfacing with other software applications. Mobile phone 160 and vehicle 170 may contain GPS (global positioning system) units 165 and 175 or other devices for determining their location tracking data such as position, direction and velocity. Software applications 164 and 174 may provide that location tracking data to software applications or tracking databases elsewhere in the network. Other types of data processing systems coupled to network 110 may also include software applications for tracking or for interfacing with software applications that track individuals and vehicles. Software applications could include a web browser, email, or other software applications that can receive, process and send location tracking data regarding individuals and vehicles, or other type of information to be processed. Software applications may be downloadable such as with a smart phone or other types of devices. Software applications may also be built in or downloadable to vehicle computer systems.

Servers 120 and 122, storage unit 130, client 140, laptop 150, mobile phone 160, vehicles 170 and 172, and other data processing devices may couple to network 110 using wired connections, wireless communication protocols, or other suitable data connectivity. Client 140 may be, for example, personal computers or network computers.

In the depicted example, server 120 may provide data, such as boot files, operating system images, and applications to client 140 and laptop 150. Client 140 and laptop 150 may be clients to server 120 in this example. Client 140, laptop 150, mobile phone 160, vehicles 170 and 172 or some combination thereof, may include their own data, boot files, operating system images, and applications. Data processing environment 100 may include additional servers, clients, and other devices that are not shown.

In the depicted example, data processing environment 100 may be the Internet. Network 110 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 2:
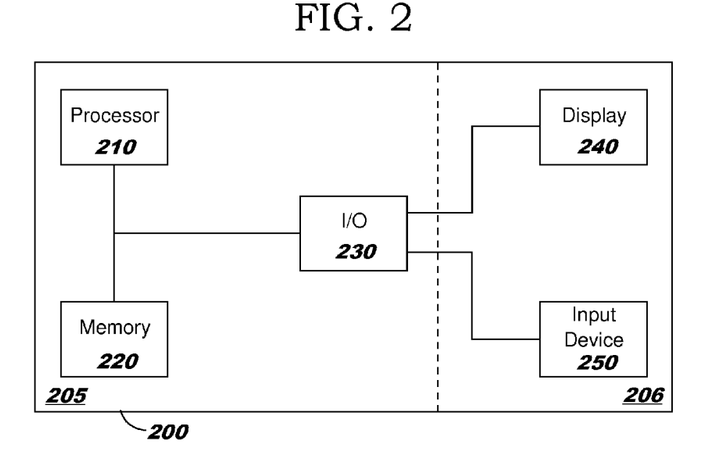
FIG. 2 depicts a block diagram of a data processing system in which various embodiments may be implemented.

FIG. 2 depicts a block diagram of a data processing system in which various embodiments may be implemented. Data processing system 200 is an example of a computer device, such as server 120, client 140, laptop 150, mobile phone 160 or vehicle 170 in FIG. 1, in which computer usable program code or instructions implementing the processes may be located for the illustrative embodiments.

In the depicted example, data processing system 200 includes a CPU or central processing unit 210 which may contain one or more processors and may be implemented using one or more heterogeneous processor systems including a graphics processor. The depicted example also includes a memory 220 which may be used for storing instructions and data to be processed by CPU 210. Memory 220 may include a main memory composed of random access memory (RAM), read only memory (ROM), or other types of storage devices. Memory 210 could also include secondary storage devices such as a hard disk drive, DVD drive or other devices which may be internal or external to data processing system 200. An input output device (I/O) 230 is also shown in the depicted example for managing communications with various input devices and output devices. However, other examples could use the CPU to communicate directly with various input or output devices or use separate input and output controllers.

In the depicted example, a computer display 240 is shown for the data processing system to communicate with a user or another data processing system. Other types of output devices may be used such as an audio device. An input device 250 is also shown which may be a keyboard, mouse, a touch sensitive display, or other types of input devices.

Data processing system 200 is shown with an internal section 205 and an external section 206. Often input and output devices may be physically separate from but connected to the CPU and memory. However, that is often not the case with portable devices such as mobile phones.

An operating system may run on processor 210. The operating system coordinates and provides control of various components within data processing system 200 in FIG. 2. The operating system may be a commercially available operating system. An object oriented programming system may run in conjunction with the operating system and provides calls to the operating system from programs or applications executing on data processing system 200. Instructions for the operating system, the object-oriented programming system, and applications or programs may be located on secondary storage devices such a hard drive, and may be loaded into RAM for execution by processing unit 210.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the embodiments may be applied to a multiprocessor data processing system.

The depicted examples in FIGS. 1-2 and above-described examples are not meant to imply architectural limitations. For example, data processing system 200 may also be a mobile phone 160, vehicle 170, tablet computer, laptop computer, or telephone device.

Figure 3:
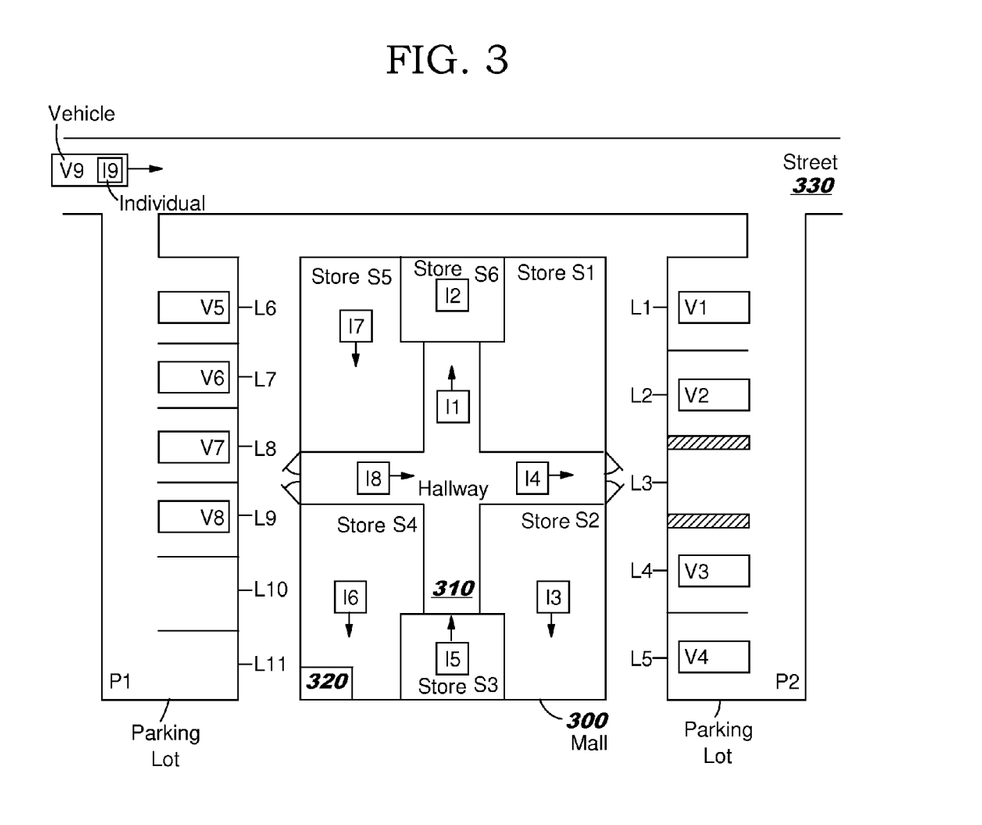
FIG. 3 depicts a diagram of a mall parking lot in which various embodiments may be implemented.

FIG. 3 depicts a diagram of an example mall and mall parking lots in which various embodiments may be implemented. One of ordinary skill in the art would be able to implement the embodiments and alternatives thereof in a large variety of parking lot configurations. For example, parking spaces for multiple blocks of a downtown center not tied to any particular retail establishment could be managed using the same approach. In this example, two parking lots P1 and P2 adjoin a mall 300. Parking lot P1 has five parking spaces L1, L2, L3, L4 and L5 for full sized vehicles including one parking space L3 limited to vehicles authorized to park in spaces for disabled persons. Parking lot P2 includes three parking spaces L6, L7 and L8 for full sized vehicles and three parking spaces L9, L10 and L11 for compact vehicles. Mall 300 has a hallway 310 and six stores S1, S2, S3, S4, S5 and S6. Also shown is a computing system 320 such as a server located in mall 310 for use in implementing this embodiment of the invention. In alternative embodiments, computing system 320 may be remotely located. Computing system 320 may manage parking space availability at a single retail establishment, several retail establishments in a common area such as a mall or a central business district, or even across multiple communities and cities. Computing system 320 may also be networked with other computing systems managing parking space availability in other locations. Street 330 leads to parking lots P1 and P2.

In parking lot P1 are four vehicles V1, V2, V3 and V4 parked in the four parking spaces L1, L2, L3 and L4 for full sized vehicles. There is one parking space L3 available for vehicles authorized to park in parking spaces for disabled persons. Individuals I1, I2, I3 and I4 arrived in vehicles V1, V2, V3 and V4 respectively and are currently located in mall 300 as shown. In parking lot P2 are four vehicles V5, V6, V7 and V8 parked in the three parking spaces L6, L7 and L8 for full sized vehicles and one compact vehicle parking space L9. There are two parking spaces L10 and L11 available for compact cars. Individuals I5, I6, I7 and I8 arrived in vehicles V5, V6, V7 and V8 respectively and are currently located in mall 300 as shown. Another vehicle V9 with individual I9 is approaching mall parking lots P1 and P2 on street 330.

In this embodiment, each vehicle has a GPS (global positing unit) and wireless communication device such as a cellular phone connection that periodically provides the location, direction and velocity of that vehicle to computing system 320. Also in this embodiment, each individual has a GPS unit that periodically provides the location, direction and velocity of that individual through a wireless connection (such as a cell phone) to computing system 320. In alternative embodiments, each vehicle may communicate with the computing system through the individual's mobile phone, such as through a Bluetooth connection to that phone. In alternative embodiments, other types of tracking systems may be used to provide the location, direction and velocity of a vehicle or person including other satellite based systems, cellular tower based triangulation systems, or other wireless triangulation systems. Other alternative embodiments may detect the location, direction and velocity of vehicles using sensors embedded in parking lot 300 and street 330 or utilize video cameras with vehicle and face recognition software. Another alternative embodiment could use an RFID (radio frequency identification) or other type of tracking device embedded in the tickets of a paid parking lot with RFID readers located in various locations including the parking lot entrance and exit and any building or store entrances and exits. In addition, location tracking data may be limited to location only which is then combined with previously provided location information to determine direction and velocity.

As individual I9 approaches mall 300 in vehicle V9, the individual may query computing system 320 whether there are any available parking spaces in parking lots P1 and P2. This query may specify the type of parking space needed such as disabled parking space, non-disabled space, compact car space, etc. This query may be performed using a software application running on the individual's mobile phone (e.g., software application 164) or vehicle (e.g., software application 174). In an alternative embodiment, the individual may have programmed the mall destination into the vehicles GPS unit (e.g., GPS 175). When vehicle V9 approaches mall 300, vehicle V9 may query computing system 320 about available parking spaces through the vehicle's wireless communication device or through the individual's mobile phone such as through a Bluetooth connection. This query may be performed at a predetermined distance or travel time from mall 300. In such a case, the results of that query may be displayed or otherwise communicated to individual I9 through the vehicle's GPS unit.

Figure 4:
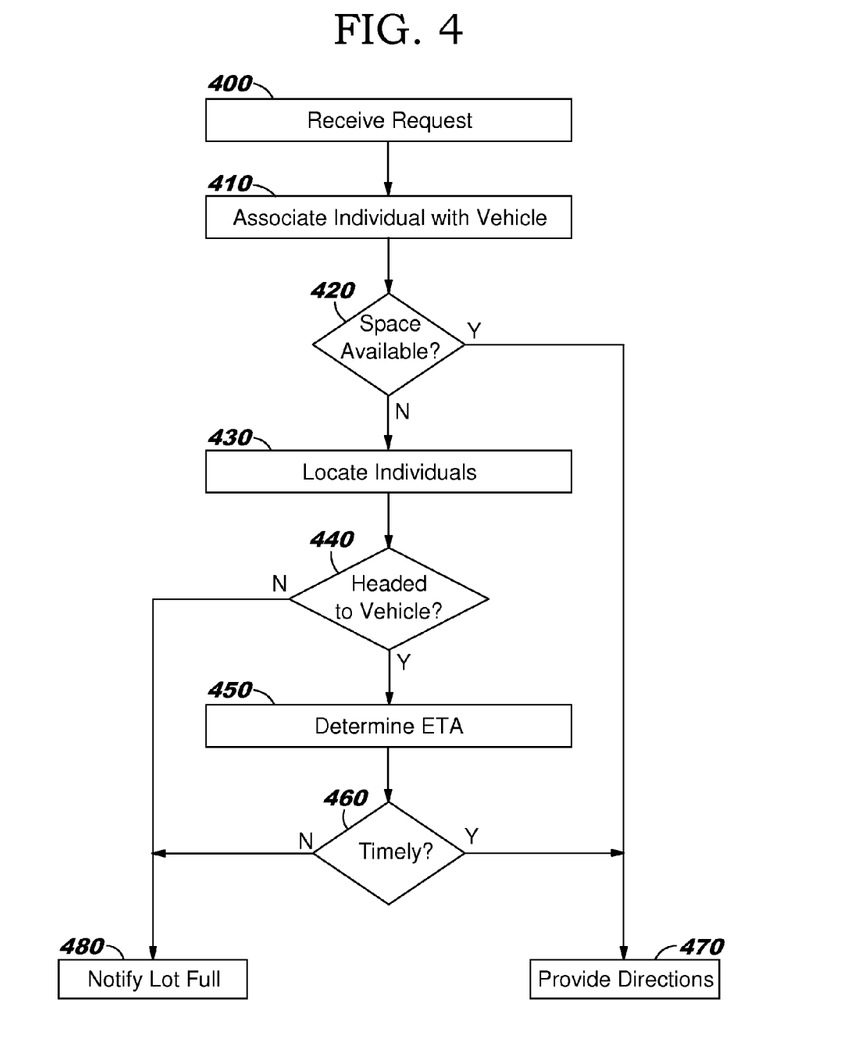
FIG. 4 depicts a flow diagram illustrating how a query regarding an available parking space may be performed in accordance with a first embodiment of the invention.

FIG. 4 is a flow diagram illustrating how a query regarding an available parking space may be performed in accordance with a first embodiment of the invention. This is discussed relative to the example described with reference to FIG. 3 above. This example assumes that all vehicles in the parking lot and individuals associated with those vehicles are known to the computing system. This could be performed by the individuals preregistering with the computing system as described with reference to FIG. 7 below. In the alternative, a combination of vehicle and face recognition software implemented with a video surveillance system may establish the same associations and tracking of individuals.

In a first step 400, computing system 320 receives a query from either individual I9 or vehicle V9. This query may include the GPS tracking information about the vehicle or individual such as position, direction and velocity. The query may also provide additional information such as whether the individual is authorized to park in the disabled parking space, whether the vehicle may park in a compact parking space, etc. Such information may have already been provided by the individual earlier such as in a registration system as described with reference to FIG. 7 below. This query could be generated at the prompting of the user. In the alternative, if the user has provided a destination to a vehicle navigation system, that navigation system may send the request when the vehicle reaches a certain distance (e.g., 1 mile or 1 minute) from the destination.

In step 410, computing system 320 may associate individual I9 with vehicle V9. The computing system uses this association to help determine the individual may be returning to his or her vehicle as will be explained below. However, if individual I9 had previously registered with the computing system and indicated that the individual only drove one car and identified that vehicle as V9, then this step may not be necessary.

In step 420, the computing system may determine whether there is an empty parking space meeting the requirements of individual I9 and vehicle V9. For example, if the individual is disabled and the vehicle is authorized to park in a disabled person parking space, then parking space L3 is available. If there is an empty space available, then processing continues to step 470 where the computing system directs the individual to the available parking space. For example, the computing system may point out that there is an available parking in parking lot P2 parking space L3. If there is not an empty space available that meets the needs of the individual or vehicle, then processing continues to step 430.

In step 430, computing system 320 identifies the GPS information of each individual in the mall area associated with the vehicles in the parking lot. As shown in FIG. 3, Individuals I2, I3, I5, I6 and I7 are currently in stores within the mall. However, individuals I1, I4 and I8 are in the hallways of the mall.

In step 440, computing system 320 determines whether any of the individuals in hallway 310 are headed towards their vehicle that may be parked in a space usable by the requesting individual. If not, then processing continues to step 480 where the computer system instructs the individual that the parking lot is full. However, in the example shown in FIG. 3, individual I4 is headed towards the doors of mall 310 and towards parking lot P2 where vehicle V4 is located in parking space L5.

In step 450, computing system 320 may determine the ETA (estimated time of arrival) of individual I4 arriving at vehicle V4 based on the positions of the individual and vehicle, direction of the individual, distance to the vehicle, and velocity of the individual. The computing system may also determine the ETA of individual I9 in vehicle V9 to parking space L5. Various algorithms may be used to help determine these ETAs including historical information about the individuals and vehicles involved. For example, Individual I4 may be known to wander the parking lot looking for their vehicle.

In step 460, the computing system will determine whether the ETA of I4 to parking space L5 is within a reasonable time of I9 reaching L5 in vehicle V9. If yes, the processing continues to step 470 where I9 is given directions to L5. If not, then processing continues to step 480 where I9 is informed that the parking lot is full. It is in this step that an issue of multiple vehicles contending for a single parking space may be resolved. If two or more vehicles may reach the same parking space within a reasonable time, the vehicle reaching the parking space first, after the parking space is predicted to be vacated, will be the vehicle assigned to that parking space. The other vehicles may not be notified of this parking space being vacated.

In step 470, the directions could be provided in various ways. For example, the individual making the request (user) may receive an indexed location of one or more parking spaces. In this example, individual I9 may be told that space L5 or parking lot P2 will become available and an ETA of when that becomes available or when I9 could arrive is provided. In the case of multiple parking spaces becoming available, requesting individual I9 could be provided multiple choices with various ETAs, perhaps ranked by ETA. In the alternative, requesting individual 19 may be provided a graphical map showing the various parking spaces available including ETAs for each parking space. This would allow the individual to select the parking space most desirable such as closest to the store the individual plans to visit. This alternative approach may be particularly application if the individual's vehicle has a graphical GPS navigation device. ETAs may be indicated using various colors such as green for the parking space with earliest availability to yellow for later availability. The user may also set some preset threshold ETA such that only those parking spaces available within a given timeframe will be disclosed to the user. The user may also request that only a certain number of parking spaces with the earliest ETA be disclosed. The parking spaces may also be grouped by the computing system so the user can choose the densest area of empty parking spaces to maximize the likelihood of finding a space available upon arrival.

Figure 5:
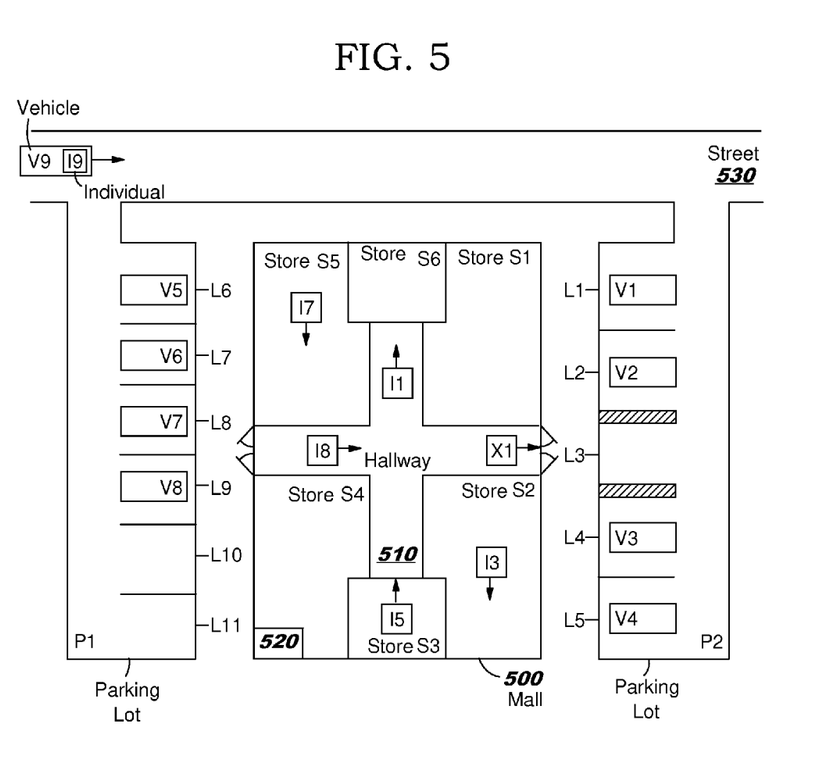
FIG. 5 depicts a diagram of a mall parking lot in which various embodiments may be implemented.

FIG. 5 depicts a diagram of an example mall and mall parking lots in which various embodiments may be implemented. One of ordinary skill in the art would be able to implement the embodiments and alternatives thereof in a large variety of parking lot configurations. For example, parking spaces for multiple blocks of a downtown center not tied to any particular retail establishment could be managed using the same approach.

This depiction is similar to the example given in FIG. 3 above with a few differences. In this example, I1, I3, I5, I7, I8 and I9 are known to computing system 520 and associated to vehicles V1, V3, V5, V7, V8 and V9 respectively whereas vehicles V2, V4 and V6 are not associated with any individuals. The known individuals may be registered with the computing system and may be tracked through their mobile phones. Vehicles V2, V4 and V6 may be known to the system due to sensors or video surveillance because they are parked in parking spaces L2, L5 and L7 respectively. In addition, an individual X1 not tracked by the system may be observed by a video surveillance system coupled to computing system 520 exiting mall 500 through doors to parking lot P2.

As described with reference to FIG. 3 above, individual I9 approaches mall 500 in vehicle V9, the individual may query computing system 520 whether there are any available parking spaces in parking lots P1 and P2. This query may specify the type of parking space needed such as disabled parking space, non-disabled space, compact car space, etc. This query may be performed using a software application running on the individual's mobile phone. In an alternative embodiment, the individual may have programmed the mall destination into the vehicles GPS unit. When vehicle V9 approaches mall 500, vehicle V9 may query computing system 520 about available parking spaces through the vehicle's wireless communication device or through the individual's mobile phone such as through a Bluetooth connection. This query may be performed at a predetermined distance or travel time from mall 500. In such a case, the results of that query may be displayed or otherwise communicated to individual I9 through the vehicle's GPS unit.

Figure 6:
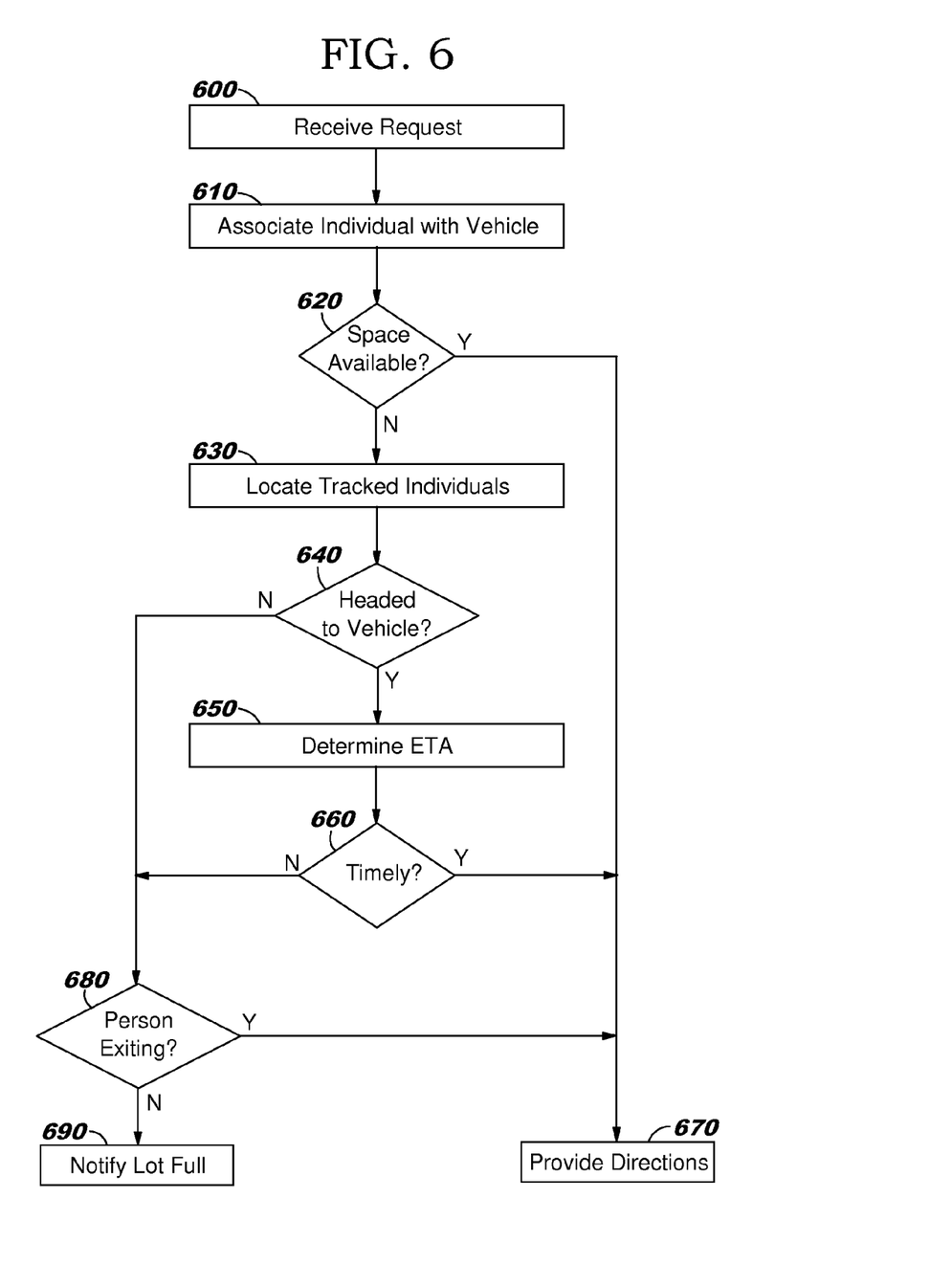
FIG. 6 depicts a flow diagram illustrating how a query regarding an available parking space may be performed in accordance with a second embodiment of the invention.

FIG. 6 is a flow diagram illustrating how a query regarding an available parking space may be performed in accordance with a second embodiment of the invention. This is discussed relative to the example described with reference to FIG. 3 above. This example assumes that only some of the vehicles in the parking lot and individuals associated with those vehicles are known to the computing system.

In a first step 600, computing system 320 receives a query from either individual I9 or vehicle V9. This query may include the GPS information about the vehicle or individual such as position, direction and velocity. The query may also provide additional information such as whether the individual is authorized to park in the disabled parking space, whether the vehicle may park in a compact parking space, etc. Such information may have already been provided by the individual earlier such as in a registration system as described with reference to FIG. 7 below. This query could be generated at the prompting of the user. In the alternative, if the user has provided a destination to a vehicle navigation system, that navigation system may send the request when the vehicle reaches a certain distance (e.g., 1 mile or 1 minutes) from the destination.

In step 610, computing system 520 may associate individual I9 with vehicle V9. The computing system uses this association to help determine the individual may be returning to his or her vehicle as will be explained below. However, if individual I9 had previously registered with the computing system and indicated that the individual only drove one car and identified that vehicle as V9, then this step may not be necessary.

In step 620, the computing system may determine whether there is an empty parking space meeting the requirements of individual I9 and vehicle V9. For example, if the individual is disabled and the vehicle is authorized to park in a disabled person parking space, then parking space L3 is available. If there is an empty space available, then processing continues to step 670 where the computing system directs the individual to the available parking space. For example, the computing system may point out that there is an available parking in parking lot P2 parking space L3. If there is not an empty space available that meets the needs of the individual or vehicle, then processing continues to step 630.

In step 630, computing system 520 identifies the GPS information of each individual in the mall area associated with the vehicles in the parking lot. As shown in FIG. 5, Individuals I3, I5 and I7 are currently in stores within the mall. However, individuals I1 and I8 are in the hallways of the mall.

In step 640, computing system 520 determines whether any of the tracked individuals in hallway 510 are headed towards their vehicle that may be parked in a space usable by the requesting individual. If not, then processing continues to step 680. In the example shown in FIG. 5, no tracked individuals are in the halls and headed towards the doors of mall 510. However, if any tracked individuals were in the hallways and headed towards their parked vehicle, then processing would continue to step 650.

In step 650, computing system 520 may determine the ETA (estimated time of arrival) of an individual headed towards their vehicle based on the positions of the individual and vehicle, direction of the individual, distance to the vehicle, and velocity of the individual. The computing system may also determine the ETA of individual I9 in vehicle V9 to parking space L5. Various algorithms may be used to help determine these ETAs including historical information about the individuals and vehicles involved. For example, the tracked individual may be known to wander the parking lot looking for their vehicle.

In step 660, the computing system will determine whether the ETA of the tracked individual to their parked vehicle is within a reasonable time of I9 reaching the same location in vehicle V9. If yes, the processing continues to step 670 where I9 is given directions to the location. If not, then processing continues to step 680. It is in this step that an issue of multiple vehicles contending for a single parking space may be resolved. If two or more vehicles may reach the same parking space within a reasonable time, the vehicle reaching the parking space first, after the parking space is predicted to be vacated, will be the vehicle assigned to that parking space. The other vehicles may not be notified of this parking space being vacated.

In step 670, the directions could be provided in various ways. For example, the individual making the request (user) may receive an indexed location of one or more parking spaces. In this example, individual I9 may be told that a given parking space or parking lot will become available and an ETA of when that becomes available or when I9 could arrive is provided. In the case of multiple parking spaces becoming available, requesting individual I9 could be provided multiple choices with various ETAs, perhaps ranked by ETA. In the alternative, requesting individual I9 may be provided a graphical map showing the various parking spaces available including ETAs for each parking space. This would allow the individual to select the parking space most desirable such as closest to the store the individual plans to visit. This alternative approach may be particularly application if the individual's vehicle has a graphical GPS navigation device. ETAs may be indicated using various colors such as green for the parking space with earliest availability to yellow for later availability. The user may also set some preset threshold ETA such that only those parking spaces available within a given timeframe will be disclosed to the user. The user may also request that only a certain number of parking spaces with the earliest ETA be disclosed. The parking spaces may also be grouped by the computing system so the user can choose the densest area of empty parking spaces to maximize the likelihood of finding a space available upon arrival.

In step 680 the system determines if an individual not tracked by computing system 520 may be exiting the doors of the mall. This may be detected by a variety of means known to one of ordinary skill in the art including video surveillance, door sensors, etc. If no, the processing continues to step 690 where I9 is informed that the parking lot is full. If an individual not tracked is exiting the mall, then processing continues to step 670 where I9 is provided directions to the parking lot where X1 is entering.

Figure 7:
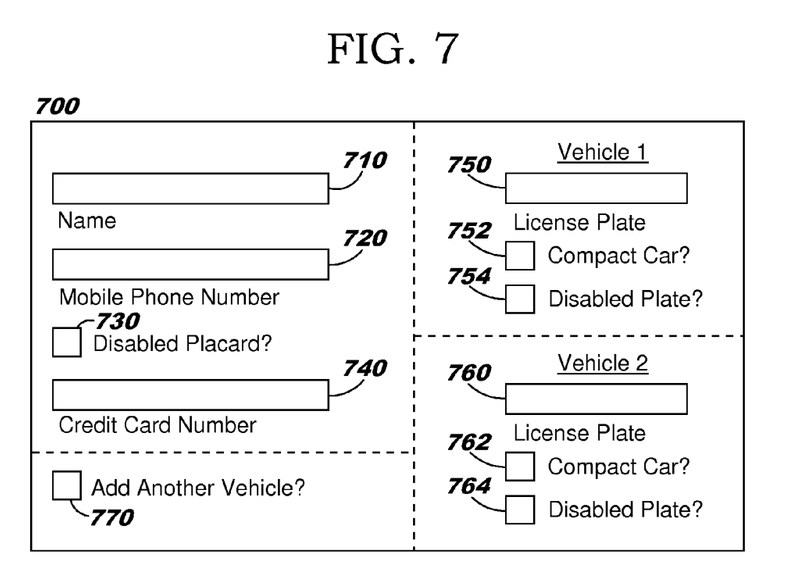
FIG. 7 depicts a block diagram illustrating a possible interface for an individual to register with a parking lot management system.

FIG. 7 depicts a block diagram illustrating a possible interface for an individual to register with a parking lot management system. This allows an individual to register with the system, provide information which would assist in finding the correct type of parking space to meet the needs of the individual, and to associate that individual with one or more vehicles.

The individual may provide his or her name 710, phone number 720 of the phone used to contact the computing system when approaching a parking lot, an indication 730 whether the individual has a portable placard for parking in parking spaces dedicated to disabled persons, and a credit card number 740. The credit card number may not be requested. However, if there is a charge for this service or if the parking lot charges for parking, this may be used to allow the individual to pay those costs electronically.

One or more vehicles may also be registered and associated with the individual. In this case two vehicles may be registered including the license plate 750 and 760 of the vehicles. The vehicle may also be registered as a compact car 752 and 762. In addition, the individual may indicate the vehicle has a disabled person license plate 754 and 764. A button 770 may be selected to add another vehicle for registration.

Of course, many variations of this type of registration may be implemented depending on the desired features of the implemented system. In addition, various types of data may be obtained or collected about an individual over time. For example, an individual may be known to visit certain stores, so a parking space may be located near to those particular stores. The individual demonstrate that he or she is a quick or slow walker, which could affect the ETA calculated for that individual when headed to their vehicle.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM, or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as web conference applications or plug-ins. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for a data processing system to anticipate parking space availability comprising:
   receiving from a first user a request for a parking space for a first vehicle including user selected requirements;
   obtaining user-to-vehicle association data, and location and velocity tracking data of a set of users, each of the set of users associated with one of a set of vehicles, each of said set of vehicles located at one of a set of parking spaces;
   utilizing the data processing system to predict a set of departure times based on:
     the location and velocity tracking data for a subset of the set of users away from and associated with corresponding vehicles located in associated parking spaces; and
     the location of said corresponding vehicles located in associated parking spaces;
   determining a subset of departure times that are within an acceptable period of time for said first user with respect to an estimated time of arrival;
   receiving location and velocity tracking data from the first user to determine said estimated time of arrival at the set of parking spaces for the first user;
   determining a subset of parking spaces with attributes that meets the user selected requirements, and is associated with vehicles associated with users having the subset of departure times; and
   sending the subset of parking spaces to the first user.

2. The method of claim 1 wherein the location and velocity tracking data of the first user and the set of users includes global positional system information including location and velocity.

3. The method of claim 1 wherein the first user and the set of users are preregistered with the data processing system, the data processing system maintaining a collection of historical data on each user, the collection of historical data utilized in predicting the set of departure times.

4. The method of claim 1 wherein the data processing system sends to the first user directions to the subset of parking spaces.

5. The method of claim 1 wherein the user selected requirements comprises one or more of the group consisting of type of parking space, combinations of shortest time, the shortest distance within an allowable time, number of parking spaces expected to be available, time that the slot will be vacant before the first vehicle is expected to arrive, and probabilistic data utilizing historical location tracking data tied to individual users and vehicles.

6. The method of claim 1 further comprising:
   maintaining information about the set of parking spaces;
   maintaining information about the set of vehicles in the parking spaces;

determining a location and velocity of a second user towards a second vehicle parked in one of the parking spaces;

predicting a second departure time of the second user in the second vehicle;

determining a location and velocity of a third user towards a third vehicle parked in one of the parking spaces;

predicting a third departure time of the third user in the third vehicle;

determining a first expected arrival time of the first vehicle at the location of the second vehicle;

determining a second expected arrival time of the first vehicle at the location of the third vehicle;

applying the user selected requirements; and identifying whether the second parking space or the third parking space meets the user selected requirements.

7. The method of claim 6 further comprising:

tracking location and velocity of a fourth user in a fourth vehicle;

calculating an expected arrival time of the fourth vehicle at the parking space of the second vehicle;

comparing the expected arrival time of the fourth vehicle to the second departure time of the second vehicle;

comparing the first expected arrival time of the first vehicle to the second departure time of the second vehicle; and responsive to determining that the expected arrival time of the fourth vehicle is after the expected departure time of the second vehicle and before an expected arrival time of the first vehicle, eliminating the parking space of the second vehicle as an available parking space for the first vehicle.

8. A computer usable program product comprising a non-transitory computer usable storage medium including computer usable code for use in anticipating parking space availability, the computer usable program product comprising code for performing the steps of:

receiving from a first user a request for a parking space for a first vehicle including user selected requirements;

obtaining user-to-vehicle association data, and location and velocity tracking data of a set of users, each of the set of users associated with one of a set of vehicles, each of said set of vehicles located at one of a set of parking spaces;

utilizing a processor to predict a set of departure times based on:

the location and velocity tracking data for a subset of the set of users away from and associated with corresponding vehicles located in associated parking spaces, and the location of said corresponding vehicles located in associated parking spaces;

determining a subset of departure times that are within an acceptable period of time for said first user with respect to an estimated time of arrival;

receiving location and velocity tracking data from the first user to determine said estimated time of arrival at the set of parking spaces for the first user; and determining a subset of parking spaces with attributes that meets the user selected requirements, and is associated with vehicles associated with users having the subset of departure times; and sending the subset of parking spaces to the first user.

9. The computer usable program product of claim 8 wherein the first user and the set of users are preregistered with a data processing system, the data processing system maintaining a collection of historical data on each user, the collection of historical data utilized in predicting the set of departure times.

10. The computer usable program product of claim 8 wherein a data processing system sends to the first user directions to the subset of parking spaces.

11. A data processing system for anticipating parking space availability, the data processing system comprising: a processor; and a memory storing program instructions which when executed by the processor execute the steps of:

receiving from a first user a request for a parking space for a first vehicle including user selected requirements;

obtaining user-to-vehicle association data, and location and velocity tracking data of a set of users, each of the set of users associated with one of a set of vehicles, each of said set of vehicles located at one of a set of parking spaces;

utilizing the processor to predicting a set of departure times based on:

the location tracking data for a subset of the set of users away from and associated with corresponding vehicles located in associated parking spaces, and the location of said corresponding vehicles located in associated parking spaces;

determining a subset of departure times that are within an acceptable period of time for said first user with respect to an estimated time of arrival;

receiving location and velocity tracking data from the first user to determine said estimated time of arrival at the set of parking spaces for the first user;

determining a subset of parking spaces with attributes that meets the user selected requirements, and is associated with vehicles associated with users having the subset of departure times; and sending the subset of parking spaces to the first user.

12. The data processing system of claim 11 wherein the first user and the set of users are preregistered with the data processing system, the data processing system maintaining a collection of historical data on each user, the collection of historical data utilized in predicting the set of departure times.

13. The data processing system of claim 11 wherein the data processing system sends to the first user directions to the subset of parking spaces.

14. A method for a data processing system for obtaining availability of a predicted parking space comprising:

sending through a user interface from a first user a request for a parking space for a first vehicle, the request including user selected requirements;

obtaining user-to-vehicle association data, and location and velocity tracking data of a set of users, each of the set of users associated with one of a set of vehicle, each of said set of vehicles located at one of a set of parking spaces;

utilizing the data processing system to predict a set of departure times based on:

the location and velocity tracking data for a subset of the set of users away from and associated with corresponding vehicles located in associated parking spaces, and the location of said corresponding vehicles located in associated parking spaces;

determining a subset of departure times that are within an acceptable period of time for said first user with respect to an estimated time of arrival;

sending through the user interface location and velocity tracking data from the first user to allow a determination of said estimated time of arrival at the set of parking spaces for the first user;

determining locations of a subset of parking spaces with attributes that meets the user selected requirements, each of the subset of parking spaces associated with a vehicle associated with a user not located with the associated vehicle, each user having a predicted departure time;

receiving through the user interface the locations of the subset of parking spaces to the first user.

* * * * *